: US 8,072,652 B2
(45) Date of Patent: Dec. 6, 2011

(12) United States Patent
Yamada (54) IMAGE READING APPARATUS (75) Inventor: Norio Yamada, Tokorozawa (JP)

(73) Assignee: Ricoh Company, Ltd., Tokyo (JP)

( * ) Notice: Subject to any disclaimer, the term of this patent is extended or adjusted under 35 U.S.C. 154(b) by 1069 days.

(21) Appl. No.: 11/933,874

(22) Filed: Nov. 1, 2007

(65) Prior Publication Data

US 2008/0100881 A1 May 1, 2008

(30) Foreign Application Priority Data

Nov. 1, 2006 (JP) ................. 2006-297717

(51) Int. Cl.
*H04N 1/04* (2006.01)
*H04N 1/00* (2006.01)
*H04N 1/40* (2006.01)

(52) U.S. Cl. ........ 358/474; 358/496; 358/408; 358/444; 358/403; 358/448; 358/486

(58) Field of Classification Search .................. 358/408, 358/404, 403, 444, 468, 486, 1.16, 448, 474; 399/364, 374; 355/23, 24; 382/305, 318, 382/319, 312
See application file for complete search history.

(56) References Cited

U.S. PATENT DOCUMENTS 7,817,297 B2 * 10/2010 Ushida et al. ............. 358/1.16
2007/0013954 A1 1/2007 Soeda et al.

FOREIGN PATENT DOCUMENTS

JP 2002-077596 3/2002
JP 2006-013924 1/2006

* cited by examiner

*Primary Examiner* — Cheukfan Lee
(74) *Attorney, Agent, or Firm* — Oblon, Spivak, McClelland, Maier & Neustadt, L.L.P.

(57) ABSTRACT

An image reading apparatus including a first image reader for reading the front side of document, and a second image reader configured to read the reverse side of document. The apparatus also includes a storage device to store first image data read by the first image reader and second image data read by the second image reader, and a writing controller for writing the first image data and the second image data in parallel to the storage device. A reading controller then reads the first image data and the second image data sequentially from the storage device, and an image processor processes the first and second image data. An image converter then converts the format of the first image data and/or the second image data to be the same.

22 Claims, 9 Drawing Sheets

IMAGE READING APPARATUS

BACKGROUND OF THE INVENTION

1. Field of the Invention

The present invention relates to an image reading apparatus to read both sides of a document by passing the document through the image forming apparatus a single time. More particularly, the invention relates to an image reading apparatus, an image storage apparatus and an image forming apparatus that reduces size, lowers cost, and improves efficiency of reading a document with different data formats by sharing a same circuit for processing both sides of a document.

2. Discussion of the Background

In recent years, an image reading apparatus in a copier machine, an image storage apparatus, facsimile machine, scanner machine, multi peripheral machine comprising function of scanner, facsimile, and printer, is capable of reading both sides of document by passing the document through the image reading device a single time.

Some image reading apparatuses read one side of document by turning over document after finishing reading reverse side of document. But these image reading apparatuses have low efficiency to read document, because reading a document sequentially takes more time. And having to turn the document over may result in increased errors and paper jams in the document reading apparatus. Further, a document turning over device is another component necessary in the image reading apparatus for such duplex reading.

JP 2002-77596A proposes an image reading apparatus capable of reading both sides of a document by once passing the document through the image reading device. The image reading apparatus comprises image sensors at each side of feeding path of document. But the image reading apparatus comprises a first circuit of image processor for front side of document and a second circuit of image processor for reverse side of document. That causes increasing size of apparatus and cost.

Then JP 2006-13924A proposes an image reading apparatus to process related unique features of each image reading device, for example shading correction etc, according to light source and/or relation to image sensor, with front side of image data and reverse said of image data by each proper former processing device, and process the other generally process, for example filter processing, expansion/reduction processing and converting color processing etc, by same after processing device.

But the image reading apparatus comprises proper former processing device for each side of document data, is not satisfied with downsizing and reducing cost. And the image reading apparatus processes generally process with front side of image data instantly after former processing, but the image reading apparatus can not process generally process with reverse side of image data instantly after former processing, because the image reading apparatus stores reverse side of image data to a storage device temporally and reads out the reverse side image data and then process generally process with reverse side of image data. So efficiency is not different from reading each side sequentially.

Other technology for improving efficiency, enables an image reading apparatus to store both side of image data after processing by former processing device and read out the both side image data and combine the both side image data by programmable logic alley, and transmit to after processing device for processing. But the image reading apparatus needs two structure of circuit for after processing, resulting in an increased cost.

Further, reducing volume of image data for improve efficiency is caused of deterioration of image.

And these technology ignore about difference of image format of front side of image data and reverse side of image data.

SUMMARY OF THE INVENTION

The present invention provides an image reading apparatus, comprising a first image reader configured to read front side of document, a second image reader configured to read reverse side of document, a storage device to store a first image data that is read by said first image reader and a second image data that is read by said second image reader, a writing controller configured to write said a first image data and said second image data parallel to said storage device, a reading controller configured to read said first image data and said second image data sequentially from said storage device, speed of reading is faster than speed of writing, an image processor configured to process with said first image data and second image data, and an image converter configured to convert format of said first image data and/or said second image data for coincidence of format of said first image data and said second image data, if format of said first image data and said second image data is not coincident.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

An embodiment of the present invention provides an image reading apparatus and an image forming apparatus. In the following, embodiments of the present invention will be described with reference to the accompanying drawings.

Figure 1:
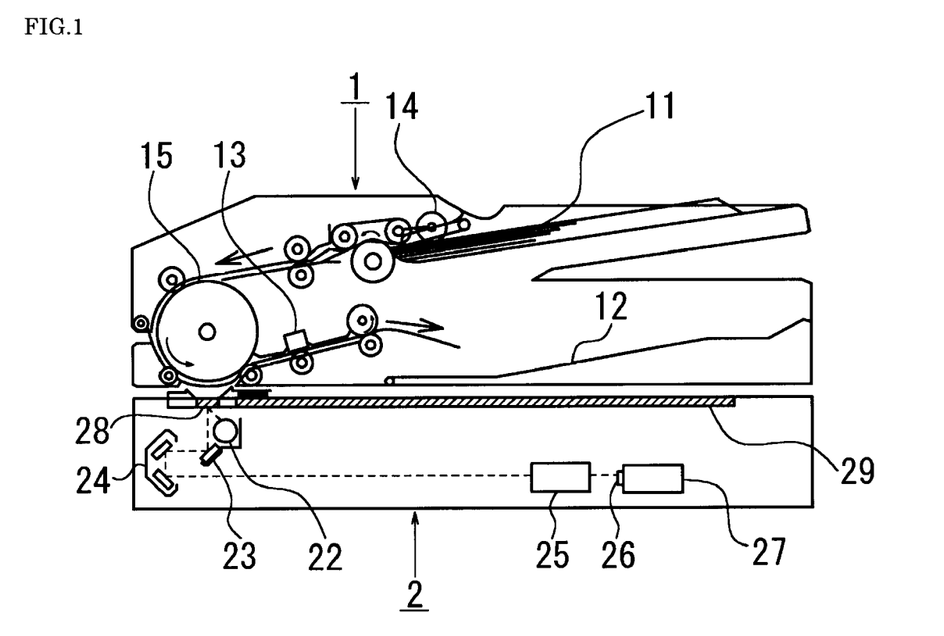
FIG. 1 is an illustrative drawing showing an image reading apparatus according to the present invention.

FIG. 1 is an illustrative drawing showing an image reading apparatus according to the present invention. In FIG. 1, ADF (Auto Document Feeder) 1 is comprised upside of the image reading apparatus. An optical image reading device 2 is comprised lower side of the image reading apparatus.

The ADF 1 comprises a tray 11 for putting on document, CIS (Contact Image Sensor) 13 for reading document and converting analog electronic signal, a discharge tray 12 for putting on discharged document. The ADF 1 also comprises pick up roller 14 and feeding drum 15 for feeding document from the tray 11 to the discharge tray 12 through a position opposite to the CIS 13.

The optical image reading device 2 comprises a first carriage 23 including light source 22 and mirror, a second carriage 24 including two mirrors, a lens 25, CCD (Charge Coupled Device) 26, a signal processor 27 for processing signal transmitted from the CCD 26 and driving device for drive the first carriage 23 and the second carriage 24 not shown in FIG. 1. The optical image reading device 2 also comprises a first contact glass 28 and a second contact glass 29 at the front of the optical image reading device 2.

The image reading apparatus has three reading modes, a first mode reads a front side of a document by resting the document on the contact glass 29, a second mode reads a front side of document while document is fed by the ADF 1, and a third mode reads both sides of a document while document is fed by the ADF 1. These modes are set by operation panel 89.

The image reading apparatus set as the first mode reads a front side of a document by CCD 26. The image reading apparatus set as the second mode reads a front side of a document by CCD or CIS 13. The image reading apparatus set as third mode reads both sides of a document by CCD 26 and CIS 13.

The image reading apparatus set by the first mode reads a front side of a document on the second contact glass 29. The first carriage 22 moves left to right along second contact glass 29 at a predetermined speed. The light source 22 flashes while the first carriage 22 moves and shines on the front side of a document. A reflection from the document is received at the CCD 26 through a mirror in the first carriage 22, two mirrors in the second carriage 24, and the lens 25. The CCD 26 converts the received reflected light from the document to analog image signal. The signal processor 27 processes the analog image signal and outputs the analog image signal.

The image reading device in the second mode reads front side of document put on the tray 11 by the CCD 26, while the document is transmitted above the contact glass 28 by the ADF 1, the first carriage 23 is set under the first contact glass 28.

The image reading device in the second mode also reads a reverse side of document while the document is transmitted position opposite to the CIS 13 by the CIS 13.

Reading a front side of a document or a reverse side of document is set by operation panel 89.

The image reading apparatus in the second mode reads front side of document by the CCD 26 as same procedure of the first mode.

The image reading apparatus set in the second mode reads a reverse side of a document by the CIS 13 by emitting light on a reverse side of a document by a light source in the CIS 13 and receives reflected light from the document via a light sensor through a selfoc lens alley in the CIS 13 and converts the received reflected light to an analog image signal, processes the analog image signal, and outputs the analog image signal.

The image reading apparatus set in the third mode reads both sides of a document by CCD 26 and CIS 13 and processes the both sides of a document image.

Figure 2:
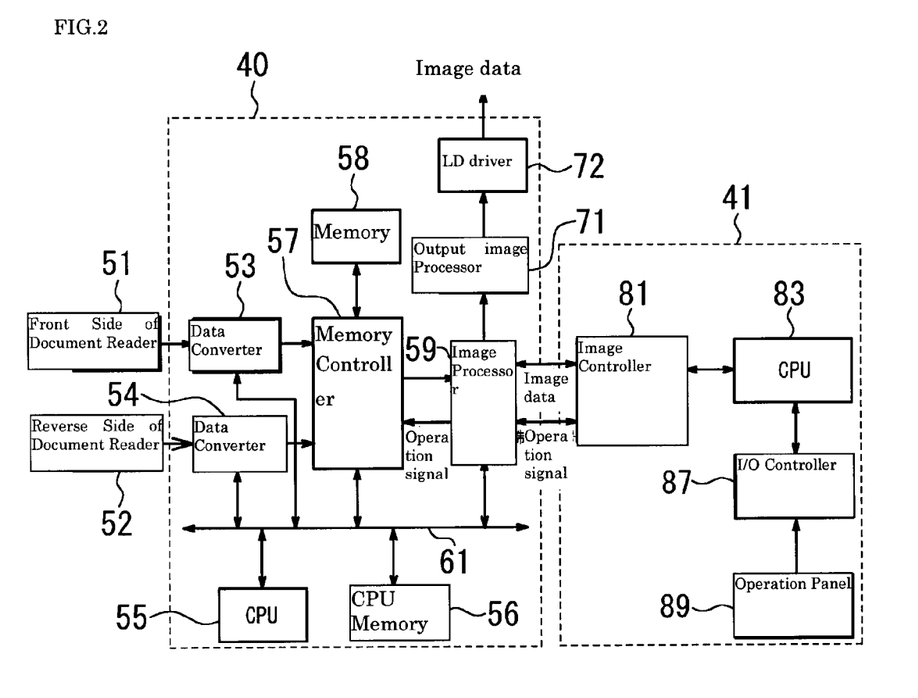
FIG. 2 is a block diagram showing an example of the construction of image forming apparatus comprising the image reading apparatus.

FIG. 2 is a block diagram showing an example of the construction of an image forming apparatus including the image reading apparatus.

The image forming apparatus comprises a front side of document reader 51, a reverse side document reader 52, an image data processor 40, a controlling image device 41. The image forming apparatus comprises an image forming device and a feeding paper device, not shown FIG. 2.

The image data processor 40 comprises a data converter 53, 54, a CPU 55, a CPU memory 56, a memory controller 57 and a image processor 59, connected via a bus 61. The memory controller 57 is connected to a memory 58, the image processor 59 is connected to an output image processor 71, and the output image processor 71 is connected to LD (laser diode) driver 72.

The controlling image device 41 comprises a CPU 83, an image controller 81 connected to the CPU 83, an I/O controller 87, and an operation panel 89 connected to the I/O controller 87.

Image data read by the front side of the document reader 51 and image data read by the reverse side of the document reader 52 are transmitted to the image data processor 40.

In the following, a front side of a document is read by the CCD 26 and a reverse side of the document is read by the CIS 13. The front side of the document reader 51 is the CCD 26 and the processing signal device 27 shown in FIG. 1. Reading the reverse side of a document is the CIS 13 shown in FIG. 3 and a processing signal device not shown. The processing signal device 27 amplifies an analog signal transmitted from the CCD 26, samples the analog signal, and converts the signal to digital image data. Similarly, the image processor not shown amplifies an analog signal transmitted from the CIS 13, samples the signals and converts it to digital image data.

Figure 3:
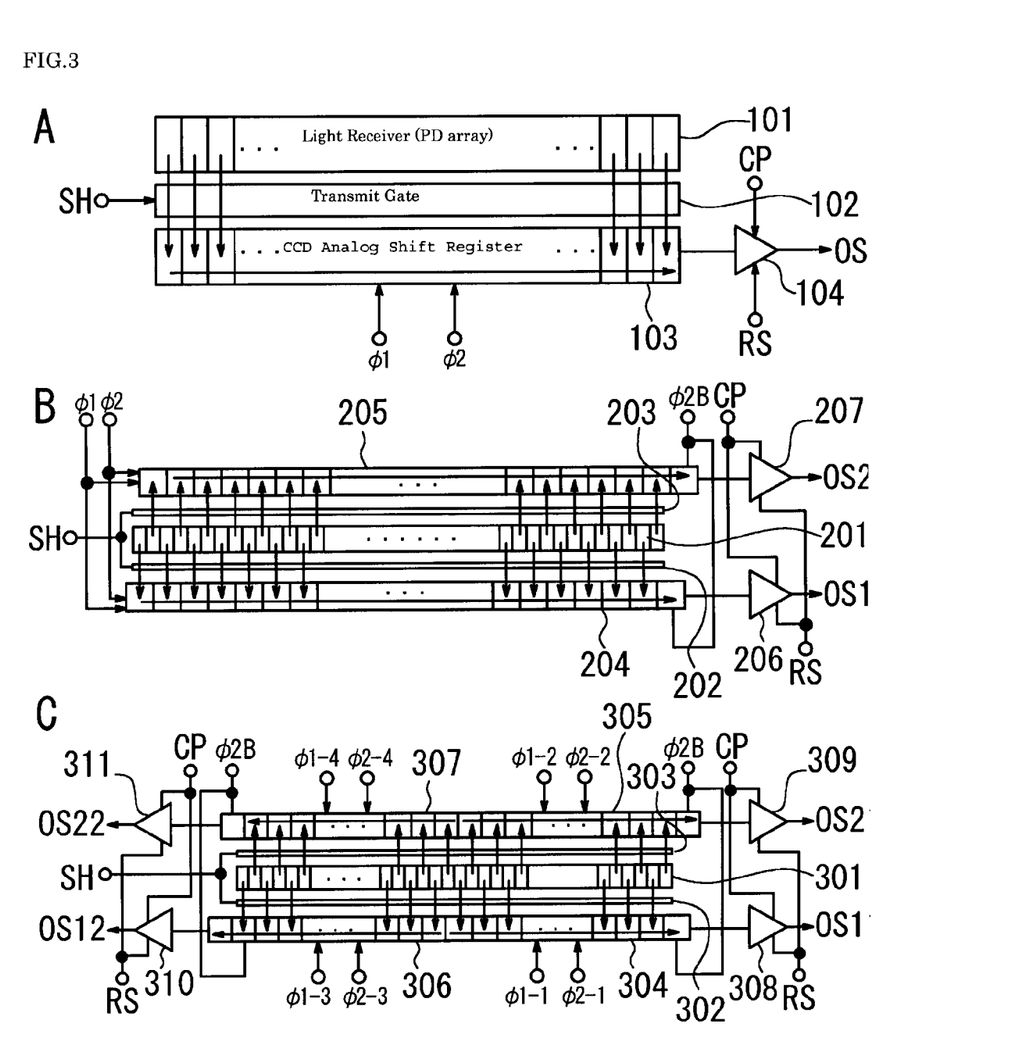
FIG. 3 is an example structure of CCD.

FIG. 3 is an example structure of the CCD 26.

FIG. 3A is a CCD comprising one channel output. FIG. 3B is a CCD comprising two channel outputs for dividing one line of image data into even pixels and odd pixels. FIG. 3C is a CCD comprising four channel outputs for dividing the two channel outputs into direction of line.

FIG. 3A shows that the CCD comprises a light receiver 101 including a PD (Photo Diode) array, a transmit gate 102, a CCD analog shift register 103, and an output buffer 104. A shift signal SH is input to the transmit gate 102, transmit clocks Φ1 and Φ2 are input to the CCD analog shift register 103, and a clamp pulse CP and a reset pulse RS are input to the output buffer 104. The light receiver 101 stores a charge of one line, and the charge is parallel transmitted to the CCD analog shift register 103 via the transmit gate 102 in accordance with the shift signal SH, and then transmitted to output buffer 104 in accordance with transmit clock Φ1 and Φ2, and then processed by a process of reset and clamp by output buffer 104 and outputted as analog image signal (OS).

FIG. 3B shows the CCD including a light receiver 201, a PD (Photo Diode) array, a transmit gate 202,203, a CCD analog shift register 204,205, and output buffer 206,207. A shift signal SH is input to the transmit gate 202,203, transmit clock Φ1, Φ2 and ΦB are input to the CCD analog shift register 204,205, and clamp pulse CP and reset pulse RS are inputted to the output buffer 206,207. The light receiver 201 stores the charge of one line. The charge of odd pixels, by counting from the left side, is transmitted in parallel to the CCD analog shift register 204 via the transmit gate 202 in accordance with the shift signal SH. The charge of even pixels is transmitted in parallel to the CCD analog shift register 205 via the transmit gate 203 in accordance with the shift signal SH and then transmitted to output buffer 206 from the CCD analog shift register 204, and transmitted to the output buffer 207 from the CCD analog shift register 205 in accordance with transmit clock Φ1, Φ2 and ΦB, and then, is processed by a process of reset and clamp by output buffer 206,207 and output as analog image signal of odd pixels (OS1) and analog image signal of even pixels (OS2).

Figure 4:
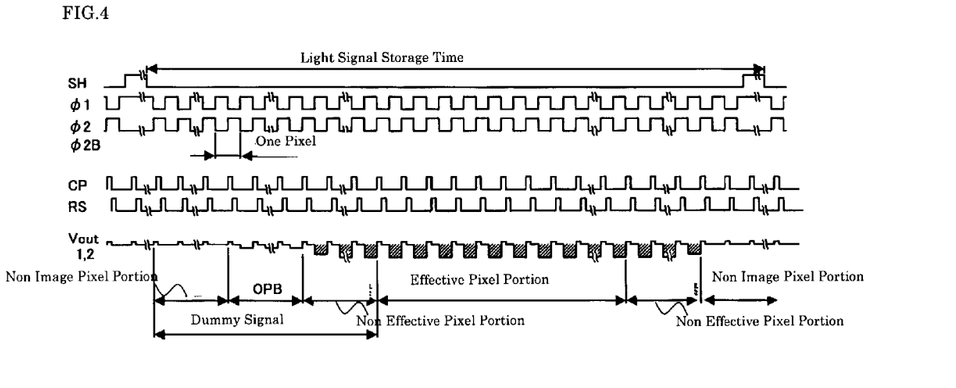
FIG. 4 is an example of relation of output signal and input signal outputted from each device shown in FIG. 3.

FIG. 4 shows the relation of the output signal and the input signal output from each device shown in FIG. 3B. The output buffer 206 and 207 outputs an analog signal comprising OPB (Optical Black), effective pixel portion, non effective pixel portion, and non image pixel portion.

FIG. 3C shows the CCD comprising a light receiver 301 and includes a PD (Photo Diode) array, a transmit gate 302, 303, a CCD analog shift register 304,305,306,307, and output buffer 308,309,310,311. A shift signal SH is inputted to the transmit gate 302,303, a transmit clock ΦB is inputted to the CCD analog shift register 304,305,306,307, and a clamp pulse CP and reset pulse RS are inputted to the output buffer 308,309,310,311. The transmit clock Φ1-1, Φ2-1, Φ2-2, Φ1-3, Φ2-3, Φ1-4, Φ2-4 are each transmitted to the CCD analog shift register 304,305,306,307.

The light receiver 301 stores the charge of one line. The charge of odd pixels by counting from the left side is parallel transmitted to the CCD analog shift register 304,306 via the transmit gate 302 in accordance with the shift signal SH. Then right side of the charge of even pixels is transmitted to the CCD analog shift register 304, and left side of the charge of even pixels is transmitted to the CCD analog shift register 306. The charge of even pixels is parallel transmitted to the CCD analog shift register 305,307 via the transmit gate 303 in accordance with the shift signal SH. Then the right side of the charge of odd pixels is transmitted to the CCD analog shift register 305, and the left side of the charge of odd pixels is transmitted to the CCD analog shift register 307. The charge transmitted to the CCD analog shift register 304,305,305,307 is transmitted to the output buffer 308,309,310,311 in accordance with a transmit clock ΦB, and then, is processed by a process of reset and clamp. Then the right side of the charge of odd pixels is outputted as analog signal (OS11), and the left side of the charge of odd pixels is outputted as an analog signal (OS21). And the right side of the charge of even pixels is outputted as an analog signal (OS12), and the left side of the charge of odd pixels is outputted as an analog signal (OS22).

Figure 5:
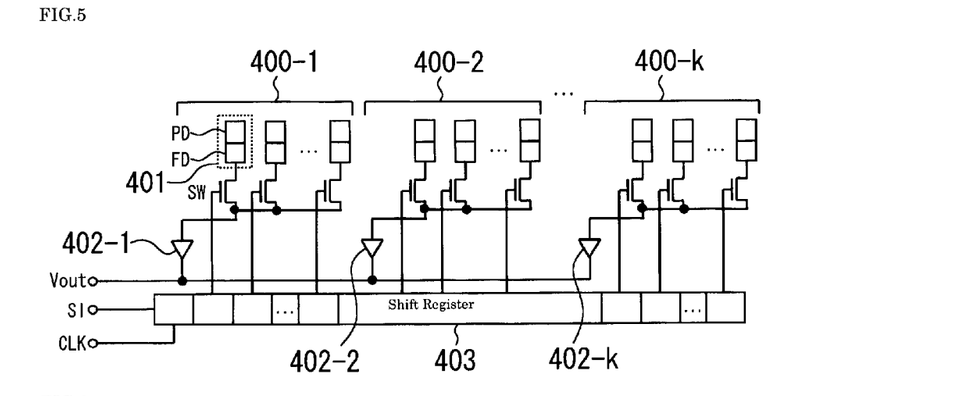
FIG. 5 is an example structure of CIS.

FIG. 5 is an example structure of the CIS 13.

FIG. 5 shows that the CIS 13 comprises sensor chips 400-1 to 400-K arranged in the main scanning direction. The sensor chips 400-1 to 400-K comprise a pixel portion including a PD, and a FD (a charge detection portion). Each pixel portion output is outputted via each buffer 402-1 to 402-K by switch SW.

Figure 6:
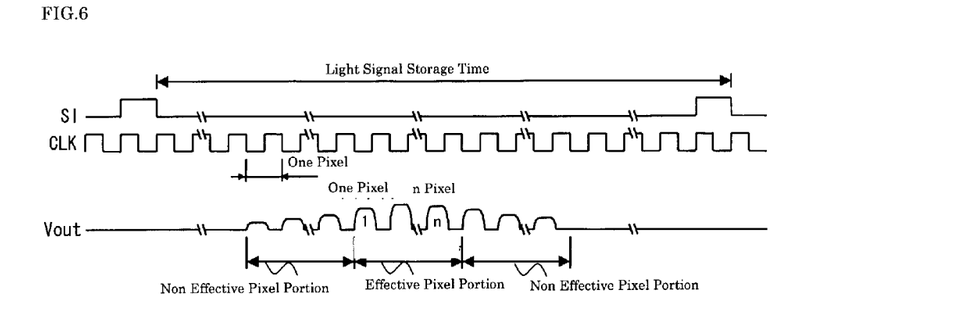
FIG. 6 is an example of timing chart of shift signal SI and operation clock CLK the switch SW.

FIG. 6 is an example of timing chart of a shift signal SI and an operation clock CLK the switch SW.

FIG. 6 shows that the switch SW is controlled to be ON/OFF by a shift register 403 receiving the shift signal SI and the operation clock CLK. Output signal Vout comprises an effective pixel portion and a non effective pixel. Dividing one line of the main scanning direction, processing in parallel, and converting one line or two lines at the output layer is available for efficiency.

As noted above, the CCD 26 and the CIS 13 are different regarding a number of channel outputs and the structure of image data etc. The embodiment described below of the CCD 26 reads the front side of a document using four channels and the CIS 13, which reads the reverse side of a document, has two channels. An analog image signal transmitted from the CCD 26 and an analog image signal transmitted from the CIS 13 samples and converts analog image date to digital image data in accordance with an operation clock transmitted to the data converter 53,54.

The data converter 53,54 converts the format of the digital image data to a format usable to the image processor 59. The image processor 59 operates two channels in parallel operation. The data converter 53 converts four channels to two channels, since the CCD 26 has four channel outputs. The data converter 54 outputs received image data as it is, since the CIS 13 has two channel outputs. The memory controller 57 writes front side image data outputted by the data converter 53 and reverse side image data outputted by the data converter 54 temporarily to the memory 58. Then above image data is outputted.

Figure 7:
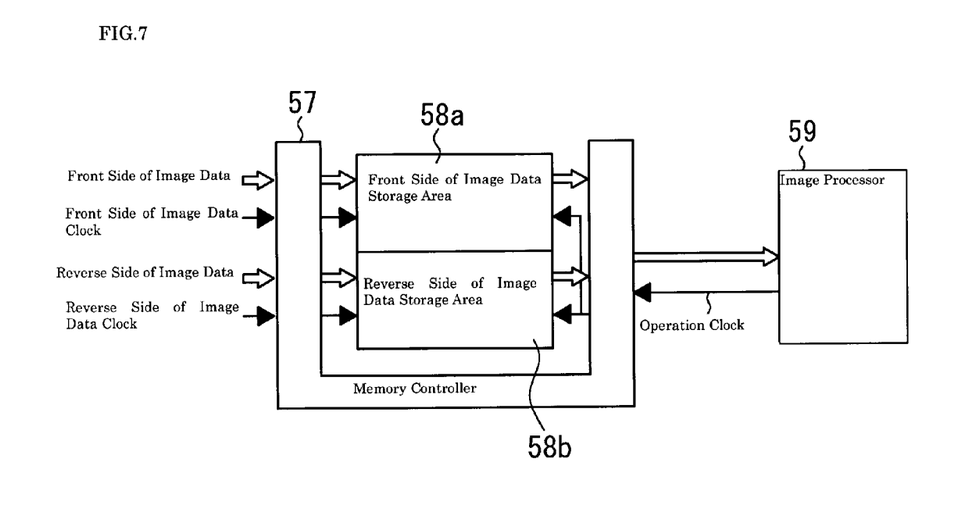
FIG. 7 is an example of relation of output and input data of a memory controller, a memory and a image processor and operation clock.

FIG. 7 shows the relationship between output and input data of the memory controller 57, the memory 58 and the image processor 59 and operation clock. The memory controller 57 writes front side image data output by the data converter 53 and reverse side image data output by the data converter 54 parallel to a predetermined front side of image data storage area 58a and a predetermined reverse side of image data storage area 58b in accordance with each predetermined image data clock. The memory controller 57 reads front side image data in accordance with the operation clock of the image processor 59 and then the memory controller 57 reads reverse side image data accordance with the operation clock of the image processor 59. Then the memory controller inputs front side image data and reverse side image data to the image processor 59. The operation clock of the image processor 59 has twice the speed (hertz) than the image data clock, so the reading apparatus has high efficiency, although the memory controller 57 reads front side image data and reverse side image data serially.

Figure 8:
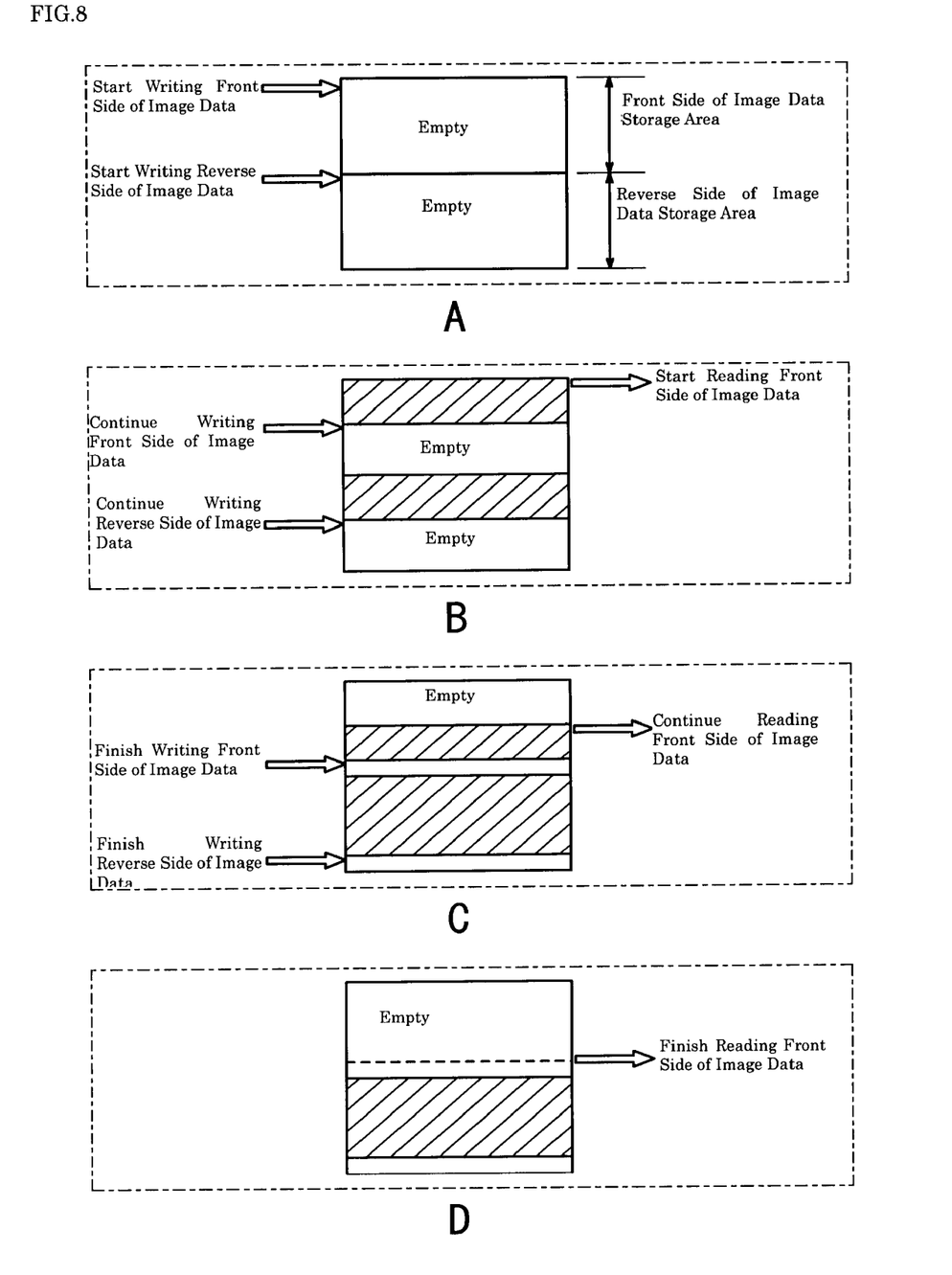
FIG. 8 is an example of a part of procedure of writing and reading front side of image data and reverse side of image data.
Figure 9:
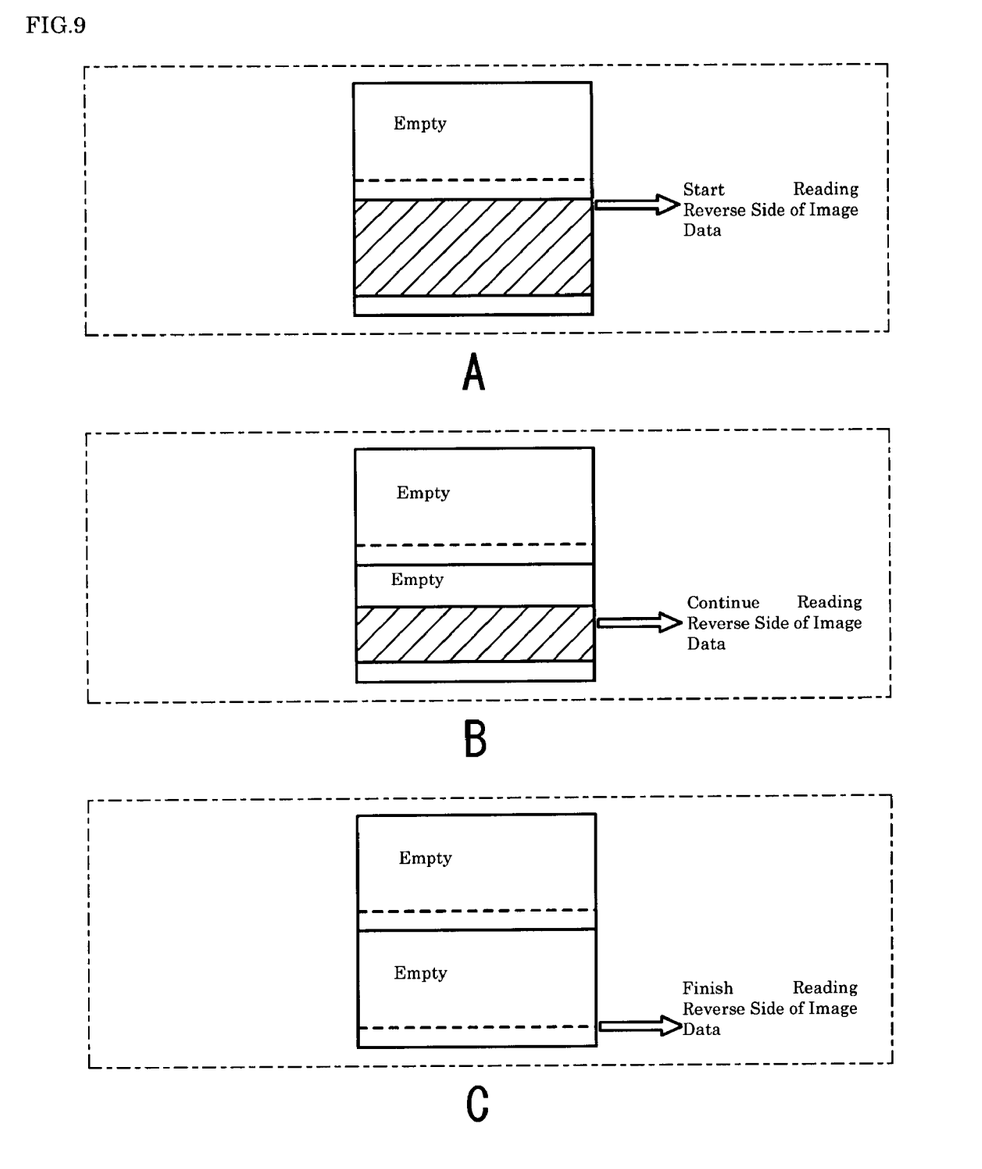
FIG. 9 is an example of a part of procedure of writing and reading front side of image data and reverse side of image data.

FIGS. 8 and 9 show an example of a procedure of writing and reading front side image data and reverse side image data. The operation panel 89 indicates which side is the front side image data, and the front side image data is first in sequence of reading.

FIG. 8A shows that the memory controller 57 starts writing front side image data and reverse side image data to the predetermined front side image data storage area 58a and the predetermined reverse side image data storage area 58b in accordance with each image data clock starts independently.

FIG. 8B shows that the memory controller 57 starts reading the front side image data in accordance with an operation clock of the image processor 59 if the front side image data is written to predetermined volume. The memory controller 57 decides that predetermined volume of the front image data is written by counting the writing lines.

FIG. 8C shows that the memory controller 57 continues reading the front side image data from the predetermined front side image data storage area 58a and writing the reverse side image data to the predetermined reverse side image data storage area 58b. The memory controller 57 finishes writing the reverse side image data at almost same time that the memory controller 57 finishes reading the front side image data.

FIG. 8D shows the memory controller 57 finished reading the front side image data. FIG. 9A shows that the memory controller 57 starts reading the reverse side image data after a predetermined time passes from the memory controller 57 has finished reading the front side image data. FIG. 9B shows that the memory controller 57 continues to read the reverse side image data. FIG. 9C shows the memory controller 57 finishes reading the reverse side image data, meaning that the reading operation is completed.

The image data written to the memory 58 includes non effective pixels. The memory controller 57 reads effective pixels by reading data from a memory address in accordance with predetermined pixel data. That process improves throughput of image data after reading by compensating for of the time taken to convert parameters in accordance with the front side image data and the reverse side image data at the image processor 59, and achieves predetermined SPM (Scan per Minute). The image data processor 40 can reduce processed pixels by processing effective pixels only if the front side image data and the reverse side image data are finished processing of shading correction by the front side document reader 51 and the reverse side document reader 52. The image processor 59 can reduce processing time by reducing data of one main scanning line, although the front side image data and the reverse side image data are not finished processing of shading correction, since the image data written to the memory 58 includes non effective pixels.

The memory controller 57 controls writing timing and reading the front side image data and the reverse side image data, and the image processor 59 processes a series of image processing. The image processor 59 may convert image parameters in accordance with different types of an image reading device, for example CIS, CCD etc. Because different types of an image reading devices have different potential for future development, for example gamma (γ) characteristics and MTF (Modulation transfer Function) characteristics etc., this embodiment shows one of example that the image processor 59 has parameters at a register and converts the parameters as described below.

The image processor 59 converts a parameter for processing reverse side image data after finishing processing the front side image data. The CPU 55 determines when the image processor 59 finishes processing the front side image data by detecting that a count line value of a line counter in the image processor 59 is on the last line. The CPU 55 sets a parameter for processing a reverse side of image data stored at the CPU memory 56 to the register in the image processor 59 after the CPU 55 determines that the image processor 59 finishes processing the front side image data. The CPU 55 then orders the image processor 59 to convert a parameter. Further, the CPU 55 orders the memory controller 57 to start reading the reverse side image data after the CPU 55 sets a parameter. It is possible to trigger the start of reading the reverse side image in accordance with a predetermined time.

Figure 10:
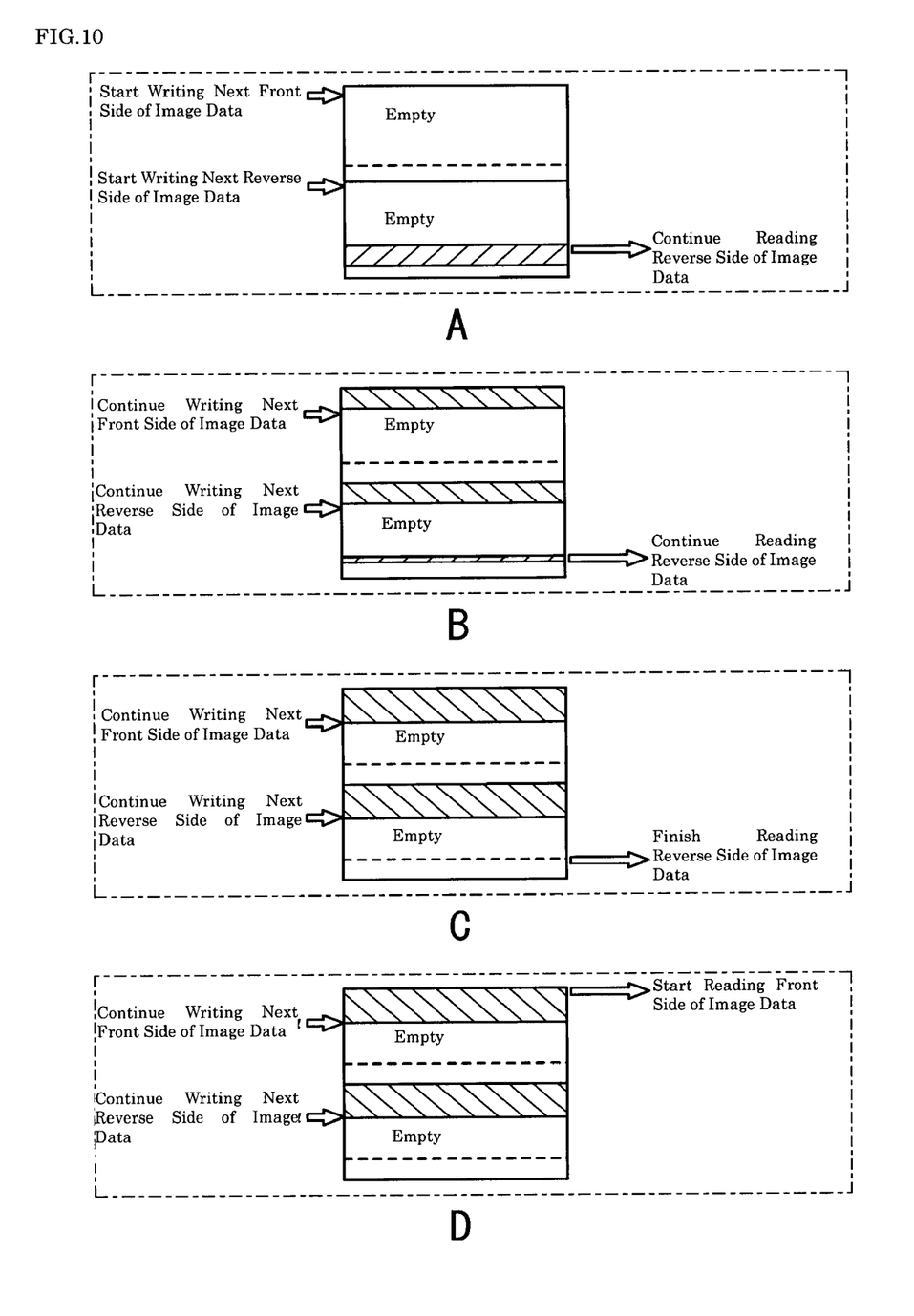
FIG. 10 is an example of sequence of writing and reading front side of image data and reverse side of image data of plural documents.
Figure 11:
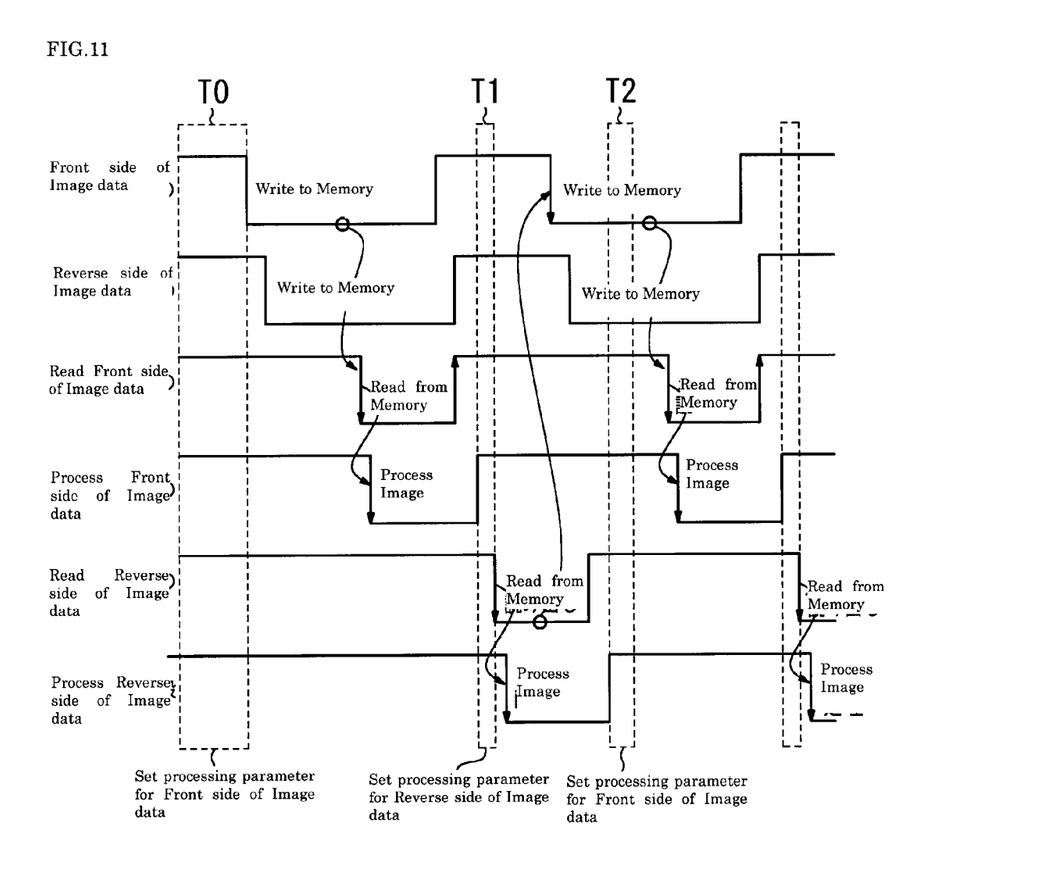
FIG. 11 is an example of procedure of converting parameter.

FIG. 10 shows one example of a sequence of writing and reading the front side image data and the reverse side image data of plural documents, and FIG. 11 shows one example of procedure of converting a parameter.

FIG. 10A shows the CPU 55 determines that time is suitable for reading a next document, if the CPU 55 determines there is a next document based on an output of a document sensor configured in the tray 11. The CPU 55 determines that the time is suitable for reading a next document when a value of the line counter in the memory controller 57 exceeds a predetermined value of a line, or a value of a line counter in the image processor 59 exceeds a predetermined value of line, or the controlling image device 41 finishes processing. The CPU 55 orders the front side document reader 51 and the reverse side document reader 52 to start reading if the time is suitable for reading a next document. The data converter 53,54 converts image data output by the front side document reader 51 and the reverse side document reader 52. The memory controller 57 writes front side of image data outputted by the data converter 53 and reverse side of image data outputted by the data converter 54 to the memory 58.

FIG. 10B shows that the memory controller 57 continues to read the reverse side image data and write front side image data of a next document and reverse side image data of a next document. FIG. 10C shows that the memory controller 57 finishes reading the reverse side image data.

The image processor 59 processes the image data read by the above procedure.

The image processor 59 converts a parameter for processing reverse side image data to a parameter for processing front side image data after processing the reverse side image data. The CPU 55 determines when the image processor 59 finishes processing the reverse side image data by detecting that a count value of a line counter in the image processor 59 is on a last line.

The CPU 55 orders the memory controller 57 to start reading front side image data of a next document after the image processor 59 finishes converting the parameter, if the front side image data of a next document is written to a predetermined volume. FIG. 10D shows that the memory controller 57 starts reading front side image data of next document.

FIG. 11 shows that the memory controller 57 starts writing the front side image data faster than the reverse side image data after the image processor 59 sets a parameter for processing the front side image data and the memory controller 57 starts reading the front side image data while the memory controller 57 continues to write the front side image data, and the image processor 59 processes the front side image data. The image processor 59 sets a parameter for processing reverse side image data within a predetermined time T1. The memory controller 57 starts reading the reverse side image data after the predetermined time T1 passes. The memory controller 57 starts writing front side document data of a next document while the memory controller 57 continues to read the reverse side image data and the image processor 59 processes the reverse side image data. The image processor 59 sets a parameter for processing front side image data within a predetermined time T2.

The image reading apparatus can have a register for storing a parameter for processing front side image data and another register for storing a parameter for processing reverse side image data and can switch both registers.

The image reading device transmits image data processed by the image processor 59 to the controlling image device 41. The image reading apparatus converts the image data at the image controller 81 and the CPU 83 and transmits to the output image processor 71 and LD driver 72 via the image processor 59. The LD driver 72 lights a photoconductor in accordance with the input image data. The photo conductor has image and the image is printed by transferring and fixing procedure.

The controlling image device 41 can inform the controlling image device 41 that the converting process is completed, for example integration, changing angle etc, and estimate a time of finishing the converting procedure to the image data processor 40. The image data processor 40 can use the above information for management of controlling the memory controller 57.

As described above, the image reading apparatus can unitize latter image processing for both sides of image data by converting an image format. And the image reading apparatus maintains quality of both sides of image data and process aimed image processing by writing both sides of image data parallel and reading each side of image data sequentially, not necessarily including plural image processor. So the present invention provides an image reading apparatus, an image storage apparatus, an digital multi peripheral printer at a reduced cost.

The present invention provides an image reading apparatus that can write both sides of image data to memory in accordance with each transmit clock and read the both side image data accordance with an operation clock. So the present invention provides an image reading apparatus etc. that can process image data efficiently in accordance with clock data.

The present invention provides an image reading apparatus that allows a user to determine which side is the front side of a document or the reverse side of a document by using an operation device, so user doesn't care which side of a document is upright when user sets document to a tray.

The present invention provides an image reading apparatus that operates more efficiency by writing and reading in parallel if a predetermined volume of image data is finished writing.

The present invention provides an image reading apparatus that operates more efficiently by writing both sides of image data while reading operation of reverse side of image data is operated.

Further, the present invention is not limited to these embodiments, but various variations and modifications may be made without departing from the scope of the present invention.

The present application claims priority to corresponding Japanese Application No. 2006-297717, filed on Nov. 1, 2006, the entire contents of which are hereby incorporated by reference.

What is claimed is:

1. An image reading apparatus, comprising:
    a first image reader configured to read a front side of a document;
    a second image reader configured to read a reverse side of the document;
    a storage device configured to store first image data read by the first image reader and second image data read by the second image reader;
    a writing controller configured to write the first image data and the second image data in parallel to the storage device;
    a reading controller configured to read the first image data and the second image data sequentially from the storage device, wherein a speed of the reading is faster than a speed of the writing;
    an image processor configured to process the first image data and second image data; and
    an image converter configured to convert a format of the first image data and/or the second image data so that the format of the first image data and the second image data is the same.

2. The image reading apparatus of claim 1, wherein the image converter is configured to convert the format of the first image data and/or the second image data into a predetermined format compatible with the image processor.

3. The image reading apparatus of claim 1, wherein:
    a type of image sensor of the first image reader is different from a type of image sensor of the second image reader, and
    the format of the first and second image data is based on the type of image sensor.

4. The image reading apparatus of claim 1, further comprising:
    a sequence setting device configured to set a sequence of reading the first image data and the second image data.

5. The image reading apparatus of claim 4, wherein the reading controller is configured to read image data set as a first term by the sequence setting device, if the writing controller writes a predetermined volume of the image data.

6. The image reading apparatus of claim 4, wherein the reading controller is configured to read out next image data set as a next term by the sequence setting device, if a predetermined time is passed from when the reading controller finishes reading image data set as a first term by the sequence setting device.

7. The image reading apparatus of claim 6, wherein the writing controller is configured to start writing a next document while the reading controller reads image data.

8. The image reading apparatus of claim 1, wherein the reading controller is configured to read the first image data and the second image data in accordance with an operation clock of the image processor.

9. The image reading apparatus of claim 1, further comprising:
    a parameter setting device configured to set a parameter for image processing by the image processor in accordance with the first image data and the second image data.

10. The image reading apparatus of claim 9, wherein the parameter setting device is configured to set the parameter in accordance with the second image data, after the image processor finishes processing the first image data and before the reading controller reads the second image data, and set the parameter in accordance with the first image data, after the image processor finishes processing the second image data and before the reading controller reads out the first image data.

11. An image reading apparatus, comprising:
    means for reading a front side of a document;
    means for reading a reverse side of the document;
    means for storing first image data read by the means for reading a front side of a document and second image data read by the means for reading a reverse side of the document;
    means for writing the first image data and the second image data in parallel to the means for storing;
    means for reading the first image data and the second image data sequentially from the means for storing, wherein a speed of the reading is faster than a speed of the writing;
    means for processing the first image data and second image data; and
    means for converting a format of the first image data and/or the second image data so that the format of the first image data and the second image data is the same.

12. An image forming apparatus, comprising:
    an image reading apparatus, comprising
    a first image reader configured to read a front side of a document;
    a second image reader configured to read a reverse side of the document;
    a storage device configured to store first image data read by the first image reader and second image data read by the second image reader;
    a writing controller configured to write the first image data and the second image data in parallel to the storage device;
    a reading controller configured to read the first image data and the second image data sequentially from the storage device, wherein a speed of the reading is faster than a speed of the writing;
    an image processor configured to process the first image data and second image data; and
    an image converter configured to convert a format of the first image data and/or the second image data so that the format of the first image data and the second image data is the same.

13. A method for reading image data, comprising:
reading a front side of a document;
reading a reverse side of the document;
storing the first image data and the second image data in a memory;
writing the first image data and the second image data in parallel to the memory;
reading the first image data and the second image data sequentially from the storage device, wherein a speed of the reading is faster than a speed of the writing;
processing the first image data and second image data at an image processor; and
converting a format of the first image data and/or the second image data so that the format of the first image data and the second image data is the same.

14. The method of claim 13, further comprising:
converting the format of the first image data and/or the second image data into a predetermined format compatible with an image processor.

15. The method of claim 13, wherein:
a type of image sensor used to read the front side of the document is different from a type of image sensor used to read the reverse side of the document, and
the format of the first and second image data is based on the type of image sensor.

16. The method claim 13, further comprising:
setting a sequence of reading the first image data and the second image data at a sequence setting device of the image processor.

17. The method of claim 16, further comprising:
reading image data set as a first term by the sequence setting device, if the writing controller writes a predetermined volume of the image data.

18. The method of claim 16, further comprising:
reading out next image data set as a next term by the sequence setting device, if a predetermined time is passed from reading image data set as a first term by the sequence setting device.

19. The method of claim 18, further comprising:
writing a next document while reading image data.

20. The method claim 13, further comprising:
reading the first image data and the second image data in accordance with an operation clock of the image processor.

21. The method of claim 13, further comprising:
setting a parameter for image processing by the image processor in accordance with the first image data and the second image data at a parameter setting device.

22. The method of claim 21, further comprising:
setting the parameter in accordance with the second image data, after the image processor finishes processing the first image data and before reading the second image data, and setting the parameter in accordance with the first image data, after processing the second image data and before reading out the first image data.

* * * * *